United States Patent
Ooba et al.

(10) Patent No.: US 8,226,489 B2
(45) Date of Patent: Jul. 24, 2012

(54) CONSTANT VELOCITY UNIVERSAL JOINT

(75) Inventors: Hirokazu Ooba, Iwata (JP); Kazuhiko Yoshida, Iwata (JP); Keisuke Sone, Iwata (JP)

(73) Assignee: NTN Corporation, Osaka (JP)

( * ) Notice: Subject to any disclaimer, the term of this patent is extended or adjusted under 35 U.S.C. 154(b) by 163 days.

(21) Appl. No.: 12/677,191

(22) PCT Filed: Sep. 22, 2008

(86) PCT No.: PCT/JP2008/067061
§ 371 (c)(1),
(2), (4) Date: Mar. 9, 2010

(87) PCT Pub. No.: WO2009/054214
PCT Pub. Date: Apr. 30, 2009

(65) Prior Publication Data
US 2011/0003645 A1    Jan. 6, 2011

(30) Foreign Application Priority Data

Oct. 22, 2007  (JP) ................................ 2007-274135
Aug. 11, 2008  (JP) ................................ 2008-207121

(51) Int. Cl.
*F16D 3/223*  (2011.01)
*H05B 6/02*  (2006.01)
(52) U.S. Cl. ........................ 464/145; 464/906; 148/574
(58) Field of Classification Search ................. 464/140, 464/145, 902, 906; 148/574
See application file for complete search history.

(56) References Cited

U.S. PATENT DOCUMENTS

| 6,383,082 | B1  | 5/2002  | Déclas |
| 6,506,121 | B2* | 1/2003  | Kobayashi et al. ........... 464/145 |
| 6,602,358 | B1  | 8/2003  | Ochi et al. |
| 6,634,951 | B2* | 10/2003 | Sahashi et al. ................ 464/145 |
| 6,749,517 | B2* | 6/2004  | Ouchi ........................... 464/906 |
| 6,800,033 | B2* | 10/2004 | Ouchi ........................... 464/145 |
| 6,913,540 | B2* | 7/2005  | Iihara et al. ................... 464/906 |

(Continued)

FOREIGN PATENT DOCUMENTS

JP    56-065924    6/1981
(Continued)

OTHER PUBLICATIONS

Universal Joint and Driveshaft Design Manual. Warrendale, PA: Society of Automotive Engineers, 1979. p. 145-150. TJ1059.S62.*

(Continued)

*Primary Examiner* — Gregory Binda
*Assistant Examiner* — Josh Skroupa
(74) *Attorney, Agent, or Firm* — Wenderoth, Lind & Ponack, L.L.P.

(57) ABSTRACT

A constant velocity universal joint has high strength and capable of suppressing deformation caused by quenching at an opening end portion of a track groove of an outer joint member. In an undercut-free constant velocity universal joint in which a track groove in a cup portion of the outer joint member has a hardened layer formed by induction quenching, an opening end surface is protruded by a protruding amount t in an axial direction from a groove bottom of the track groove in a relief surface. The protruding amount t satisfies a relation of t=0.037d to 0.185d when a diameter of a torque transmission ball is represented by d. The opening end surface in a protruded portion and an outer surface of the cup portion continuous to the opening end surface have an unhardened layer free from hardening by quenching.

14 Claims, 5 Drawing Sheets

U.S. PATENT DOCUMENTS

| | | | |
|---|---|---|---|
| 6,969,201 B2 * | 11/2005 | Tajima | |
| 7,025,685 B2 * | 4/2006 | Yoshida et al. | 464/145 |
| 2005/0261066 A1 * | 11/2005 | Nakagawa et al. | 464/145 |
| 2007/0034301 A1 * | 2/2007 | Hasegawa et al. | |

FOREIGN PATENT DOCUMENTS

| | | | |
|---|---|---|---|
| JP | 57-067127 | | 4/1982 |
| JP | 04-194418 | | 7/1992 |
| JP | 2000-154828 | | 6/2000 |
| JP | 2002-541395 | | 12/2002 |
| JP | 2006-046613 | | 2/2006 |
| JP | 2006046613 | * | 2/2006 |
| JP | 2006-275171 | | 10/2006 |
| JP | 2006-312460 | | 11/2006 |
| JP | 2006312460 | * | 11/2006 |
| JP | 2007-138192 | | 6/2007 |
| JP | 2007-161147 | | 6/2007 |
| JP | 2007-255461 | | 10/2007 |
| JP | 2007255461 | * | 10/2007 |

OTHER PUBLICATIONS

International Preliminary Report on Patentability and Written Opinion of the International Searching Authority issued May 20, 2010 in International (PCT) Application No. PCT/JP2008/067061.

International Search Report issued Nov. 11, 2008 in International (PCT) Application No. PCT/JP2008/067061.

* cited by examiner

CONSTANT VELOCITY UNIVERSAL JOINT

BACKGROUND OF THE INVENTION

I. Technical Field

The present invention relates, for example, to an undercut-free constant velocity universal joint used in a front-wheel drive shaft of an automobile.

II. Description of the Related Art

The constant velocity universal joint is used in a power transmission system of an automobile or various industrial machines, and connects a rotating shaft on a driving side to a rotating shaft on a driven side so as to transmit torque at constant angular velocity. The constant velocity universal joint includes a fixed type one and a plunging type one. While the fixed type joint allows only angular displacement, the plunging type joint allows both the angular displacement and axial displacement.

The fixed type constant velocity universal joint used in a wheel side of the front-wheel drive shaft of an automobile is required to allow a high operating angle because wheels move right and left in connection with operation of a steering. Therefore, this constant velocity universal joint is required to have static strength strong enough to endure even if a large driving force (torque) is applied at the high operating angle, and a fatigue strength characteristic sufficient for preventing abrupt fracture even if the automobile is driven over a long distance within the warranty period.

The fixed type constant velocity universal joint includes a Rzeppa joint (hereinafter, referred to as BJ) and an undercut-free joint (hereinafter, referred to as UJ). Each of the BJ and UJ includes an outer joint member having a cup portion opening at one end, an inner joint member positioned in the interior of the cup portion, balls interposed between the outer joint member and an inner joint member to transmit torque, and a cage for retaining the balls therein. Further, the cup portion of the outer joint member has track grooves which are formed in an inner surface thereof and along which the balls roll, and the inner joint member has track grooves which are formed in an outer surface thereof and along which the balls roll.

In the BJ, the track grooves of the cup portion of the outer joint member and the track grooves of the inner joint member have axial sections of a circular-arc shape. In contrast, in the UJ, the circular-arc-shaped axial sections in the BJ of the track grooves of the cup portion of the outer joint member and the track grooves of the inner joint member are partially changed to a straight shape. As illustrated in FIG. 6A, an axial section of track grooves 23 of a cup portion 22 of an outer joint member 21 in the UJ has a straight shape (hereinafter, referred to as "straight portion") on an opening side.

In the UJ, a contact point between each ball 24 and each track groove 23 is positioned radially outward at an opening end portion of the track groove 23 of the cup portion 22 of the outer joint member 21 in comparison with the BJ. Therefore, a shaft interferes with the cup portion 22 of the outer joint member 21 on a further high operating angle side in comparison with the BJ, and hence it is possible to allow formation of the high operating angle. Meanwhile, in order to ensure that the UJ allows the high operating angle, it is necessary to make permissible the load higher than that of the BJ. Therefore, the UJ generally has the cup portion 22 which has a larger outer diameter than that of the BJ so as to ensure strength. However, there is a need for reduction in size of the cup portion 22 of the UJ. Therefore, for the reduction in size, it is necessary to further increase permissible stress of the cup portion 22.

In order to increase strength of the cup portion 22 of the outer joint member 21, it is necessary to increase strength of portions which are prone to be fractured of the cup portion 22. The portions which are prone to be fractured of the cup portion 22 are vicinities of the opening end portions of the track grooves 23. As one method for increasing strength of the opening end portions of the track grooves 23, hardening by quenching is exemplified. The hardening by quenching provides an effect of suppressing plastic deformation of track opening portions. As quenching for suppressing deformation of the opening end portions of the track grooves 23, various methods have already been devised.

For example, the invention described in JP 57-67127 A discloses the following method. For the purpose of providing compressive residual stress so as to increase fatigue strength of the opening end portion of the outer joint member 21, an excess thickness is provided in the opening end portion of the outer joint member 21 in advance, and the excess thickness of the opening end portion is eliminated after quenching.

Further, the invention described in JP 4-194418 A discloses the following method. The opening end portions of the track grooves 23 of the outer joint member 21 which are subjected to induction quenching are further subjected to shot peening so as to be provided with compressive residual stress, to thereby increase the fatigue strength of the opening end portions of the track grooves 23 of the outer joint member 21.

Further, in the invention described in JP 56-65924 A, a heat-absorbing body is brought into contact with the opening end portions of the track grooves 23 of the outer joint member 21 so as to decrease depth of hardened layers in the opening end portions of the track grooves 23. This is because, when the depth of the hardened layers formed by induction quenching of the opening end portions of the track grooves 23 of the outer joint member 21 is increased, unhardened layers are reduced, to rather decrease the fatigue strength.

SUMMARY OF THE INVENTION

However, generally, when the track grooves 23 are hardened by quenching, the cup portion 22 of the outer joint member 21 is gradually increased in diameter while extending from an opposite-opening-end side to an opening-end side, which causes a dimension error in the cup portion 22. That is, PCD of the track grooves 23 on the opening-end side increases, and hence the cup portion 22 exhibits a tapered shape in which straight portions of the track grooves 23 are opened on the opening side as a whole. This is because the cup portion 22 is constituted by a portion restrained on the opposite-opening-end side and a portion opened on the opening-end side.

In the UJ using this outer joint member 21, gaps between the balls 24 and the track grooves 23 are increased when the operating angle is high, and abnormal noise is generated. With respect to this problem, conventionally, a punch used for forging of the outer joint member 21 is formed into a special shape so that the outer joint member 21 before quenching is formed into a desired shape after deformation by quenching. That is, there is used a punch of a shape which forms a reverse-tapered shape in which the straight portions of the track grooves 23 of the outer joint member 21 are closed on the opening-end side. However, in this countermeasure, the number of processes increases for manufacturing the punch of the special shape, and hence manufacturing cost of the punch increases. Further, strong resistance is generated when the punch is pulled out from the inside of the cup portions 22 of the outer joint member 21 after forging, and hence the punch is prone to be damaged, which leads to reduction in life of the punch.

Therefore, in view of the above-mentioned circumstances, it is an object of the present invention to provide a constant velocity universal joint having high strength and capable of suppressing deformation caused by quenching at the opening end portions of the track grooves of the outer joint member.

In order to solve the above-mentioned problem, inventors of the present invention conducted many experiments and investigations. As a result, they obtained knowledge that, if an unhardened layer which is not subjected to hardening by quenching is expanded on an opening-end side of the cup portion 22, it is possible to suppress deformation caused by quenching. However, when the hardened layer is simply decreased, strength also decreases. Therefore, the inventors of the present invention further made investigations to obtain the following knowledge. In the conventional UJ, as illustrated in FIG. 6B in an enlarged manner, the cup portion 22 of the outer joint member 21 has, in order to prevent interference with the shaft when the high operating angle is formed, a relief surface 27 extending continuously from an inner surface 26 to an opening end surface 25. A protruding amount t in the axial direction of the opening end surface 25 from a center in a width direction of the track groove 23 in the relief surface 27 of the cup portion 22 is small. If the protruding amount t is increased, as long as the relief surface 27 is provided, an interference position between the cup portion 22 and the shaft does not change, and hence the maximum operating angle does not change. Therefore, a conventional total axial dimension of the shaft and the UJ does not increase. The present invention has been made based on the above-mentioned knowledge.

That is, for achieving the above-mentioned object, one aspect of the present invention defines a constant velocity universal joint which includes: an outer joint member including a cup portion opening at one end thereof; an inner joint member positioned in an interior of the cup portion; a ball interposed between the outer joint member and the inner joint member to transmit torque; and a cage retaining the ball, the outer joint member including: a track groove which is formed in an inner surface of the cup portion and along which the ball rolls; a tapered relief surface extending continuously from the inner surface of the cup portion to an opening end surface; and a boot groove, which is formed in an outer surface of the cup portion and in which a boot is attached, the constant velocity universal joint constituting an undercut-free constant velocity universal joint in which the track groove includes a circular-arc portion and a straight portion each having a hardened layer formed by induction quenching, in which: the opening end surface is protruded by a protruding amount t in an axial direction from a center in a width direction of the track groove in the relief surface, the protruding amount t satisfying a relation of t=0.037d to 0.185d when a diameter of the ball is represented by d; and the opening end surface in the thus protruded portion and the outer surface of the cup portion continuous to the opening end surface include an unhardened layer free from hardening by quenching.

According to the invention of the first aspect, by protruding the opening end surface in the axial direction with the protruding amount t, without increasing the conventional total axial dimension of the shaft and the UJ, it is possible to increase volume of the cup portion of the outer joint member. Further, the opening end surface in the protruded portion and the outer surface of the cup portion continuous to the opening end surface have the unhardened layer, and hence it is possible to suppress deformation caused by quenching without decreasing the strength.

A second aspect of the present invention defines the invention according to the first aspect, wherein a center of curvature of a circular arc in an axial section of the circular-arc portion of the track groove is arranged on a side opposite to a side on which the circular arc in the axial section is positioned with respect to an axis of the outer joint member.

According to the second aspect of the invention, it is possible to increase permissible load on an opposite-opening-end side of the track groove in the cup portion of the outer joint member.

A third aspect of the invention defines the invention according to the first or second aspect, wherein the unhardened layer is extended to the relief surface.

According to the third aspect of the invention, it is possible to more effectively suppress deformation caused by quenching of the cup portion of the outer joint member.

A fourth aspect of the present invention defines the invention according to the second or first aspect, wherein the hardened layer is extended to the relief surface.

According to the fourth aspect of the invention, it is possible to increase strength of the opening end portion of the track groove in the cup portion of the outer joint member.

A fifth aspect of the invention defines the invention according to the fourth aspect, wherein an effective hardened layer (Hv 513 or more) is extended to the relief surface.

According to the fifth aspect of the invention, it is possible to sufficiently ensure fatigue strength of the track groove in the cup portion of the outer joint member.

A sixth aspect of the invention defines the invention according to the fifth aspect, wherein surface hardness of a boundary portion between the track groove and the relief surface is set to Hv 500 to 780, and a grain size number is set to 8 to 13.

According to the sixth aspect of the invention, it is possible to suppress quenching cracks of the opening end portion of the track groove in the cup portion of the outer joint member.

A seventh aspect of the invention defines the invention according to any one of the first through sixth aspects, wherein carbon steel containing sulfur of 0.005 to 0.020 mass % and carbon of 0.46 to 0.58 mass % is used for the outer joint member.

According to the seventh aspect of the invention, it is possible to ensure abrasion resistance of the track groove. Further, it is possible to ensure cutting workability and toughness of the hardened layer.

An eighth aspect of the invention defines the invention according to any one of the first through seventh aspects, wherein hardness of the outer surface of the cup portion is set to Hv 280 to 400 by work hardening with cold forging.

According to the eighth aspect of the invention, it is possible to ensure strength of the cup portion and to suppress cracks of the cup portion and reduction in life of a mold.

A ninth aspect of the invention defines the invention according to any one of the first through eighth aspects, wherein a thickness of the hardened layer formed on the outer surface by heat treatment is set to 1.2 to 2.0 mm, and the inner joint member includes a core portion having hardness of Hv 300 to 600.

According to the ninth aspect of the invention, it is possible to control an amount of deformation caused by heat treatment of the inner joint member, and the strength of the inner joint member is increased.

A tenth aspect of the invention defines the invention according to any one of the first through ninth aspects, wherein the cage is made of carbon steel containing carbon of 0.46 to 0.58 mass %, and is entirely hardened by induction quenching so as to have hardness of HRC 56 to 63.

According to the tenth aspect of the invention, it is possible to ensure hardness of the cage, and to suppress reduction in life of a punch used for press working of a window of the cage.

An eleventh aspect of the invention defines the invention according to any one of the first through tenth aspects, wherein surface roughness of the ball is set to Ra 0.01 to 0.09.

According to the eleventh aspect of the invention, it is possible to improve durability of the constant velocity universal joint.

A twelfth aspect of the invention defines a method of manufacturing the constant velocity universal joint according to any one of the first through eleventh aspects, which includes a step of cooling the boot groove at the induction quenching of the track groove.

According to the twelfth aspect of invention, it is possible to suppress thermal effect at quenching, and hence it is possible to suppress increase of softening and deformation in the cup portion of the outer joint member, and reduction in fatigue strength.

A thirteenth aspect defines a method of manufacturing the constant velocity universal joint according to any one of the first through eleventh aspects, which includes: a step of induction quenching after a metal ring is press-fitted in an outer surface of the outer joint member; and a step of eliminating the metal ring after heat is removed.

According to the thirteenth aspect of the invention, it is possible to effectively suppress deformation caused by induction quenching in the cup portion of the outer joint member.

According to the present invention, it is possible to increase strength of the outer joint member of the constant velocity universal joint, and it is possible to suppress deformation caused by quenching at the opening end portion of the track groove of the outer joint member.

DETAILED DESCRIPTION OF THE INVENTION

Hereinafter, the best mode for carrying out the present invention is described.

Figure 1:
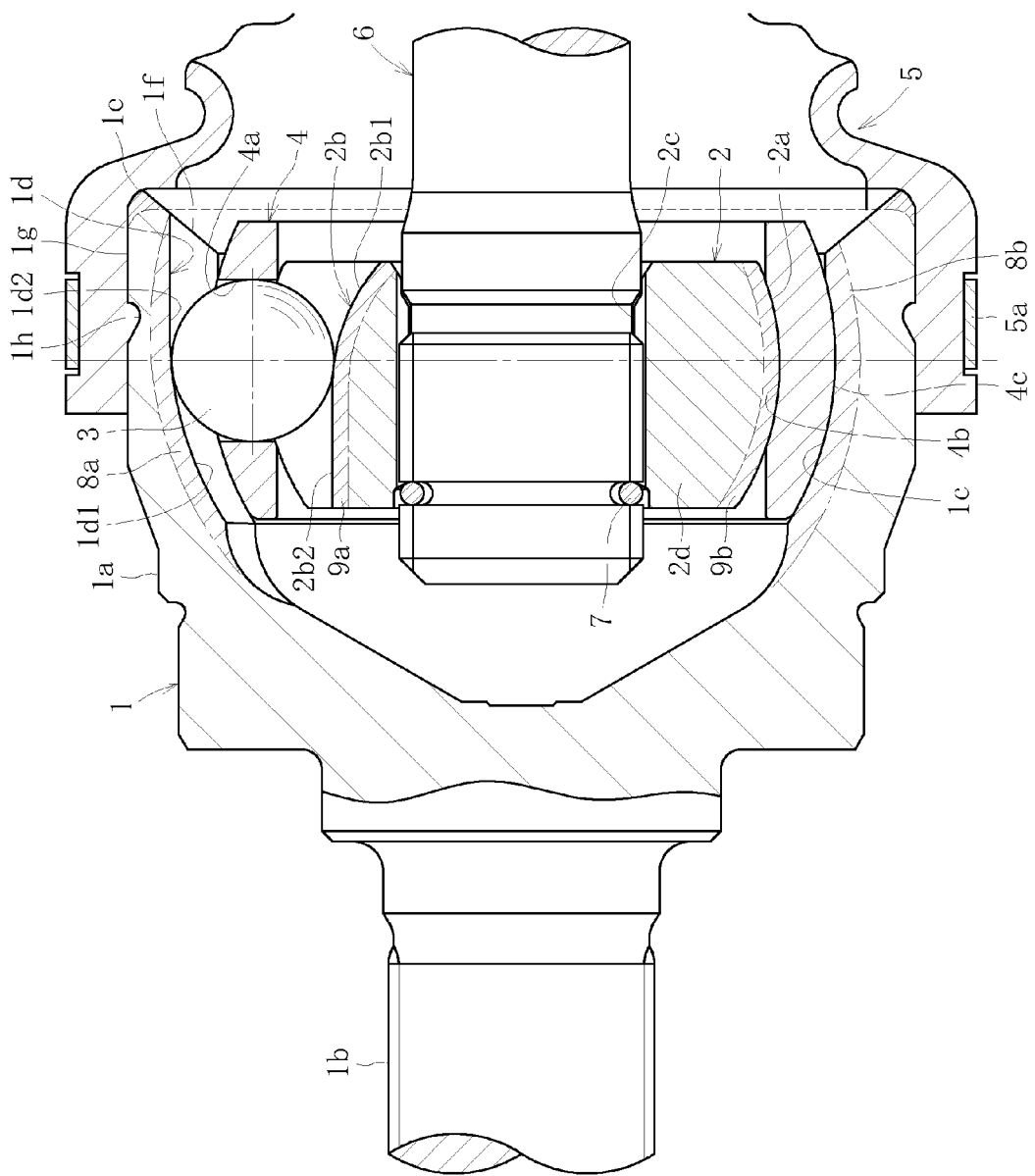
FIG. 1 is an axial sectional view illustrating an entire structure of a UJ according to an embodiment of the present invention.

FIG. 1 illustrates an example of an undercut-free constant velocity universal joint (hereinafter, referred to as "UJ") according to an embodiment of the present invention. The UJ includes, as main components, an outer joint member 1, an inner joint member 2, balls 3, and a cage 4. The outer joint member 1 includes a cup portion 1a opening on one side and a stem portion 1b. The cup portion 1a includes track grooves 1d formed in an inner surface 1c, a tapered relief surface 1f extending continuously from the inner surface 1c to an opening end surface 1e, and a boot groove 1h, which is formed in an outer surface 1g to extend in a peripheral direction and on which a boot 5 is attached.

The inner joint member 2 is positioned on an inner side of the cup portion 1a of the outer joint member 1, and has a spherical outer surface 2a. In the outer surface 2a, track grooves 2b extending in an axial direction are formed. The inner joint member 2 has a shaft hole 2c formed therein, and a shaft 6 is press-fitted into the shaft hole 2c and connected thereto by spline-fitting. The shaft 6 is prevented from detaching from the inner joint member 2 with a snap ring such as a circlip 7. The shaft 6 is connected to the inner joint member 2 and extends from an opening of the outer joint member 1.

Each track groove 1d of the cup portion 1a of the outer joint member 1 and each track groove 2b of the inner joint member 2 are paired to form a ball track, and one ball 3 is incorporated in each ball track. The balls 3 are interposed between the outer joint member 1 and the inner joint member 2 to play a role of transmitting torque therebetween. The respective balls 3 are retained in pockets 4a formed in a circumferential direction of the cylindrical cage 4. The cage 4 has a spherical inner surface 4b and comes into contact with, through the inner surface 4b, the outer surface 2a of the inner joint member 2. An outer surface 4c of the cage 4 has a spherical shape, and comes into contact with the inner surface 1c of the cup portion 1a of the outer joint member 1. One end of the boot 5 covers an opening-end side of the outer surface 1g of the outer joint member 1, and the boot 5 is fixed by a boot band 5a at a position of the boot groove 1h.

In each of the track grooves 1d of the cup portion 1a of the outer joint member 1, a circular-arc portion 1d1 and a straight portion 1d2 are formed on an opposite-opening-end-side portion and an opening-end-side portion, respectively, the circular-arc portion 1d1 and the straight portion 1d2 having groove bottoms of a circular-arc shape and a straight shape in axial sections, respectively. In each of the track grooves 2b of the inner joint member 2, a circular-arc portion 2b1 and a straight portion 2b2 are formed on an opening-end-side portion and an opposite-opening-end-side portion, respectively, the circular-arc portion 2b1 and the straight portion 2b2 having groove bottoms of the circular-arc shape and the straight shape in axial sections, respectively. Due to presence of the straight portions 1d2 and 2b2 of the track grooves 1d and 2b of the outer joint member 1 and the inner joint member 2, the maximum operating angle is set to be larger than the maximum operating angle of the conventional BJ used in a passenger automobile.

The track groove 1d and the inner surface 1c of the cup portion 1a of the outer joint member 1 have hardened layers 8a and 8b formed by induction quenching, respectively. The track groove 2b and the outer surface 2a of the inner joint member 2 have hardened layers 9a and 9b formed by heat treatment, respectively. The hardened layer 9b formed on the outer surface 2a of the inner joint member 2 has a thickness of 1.2 to 2.0 mm, and a core portion 2d has hardness of Hv 300 to 600. This condition enables control of a deformation amount of the inner joint member 2, to thereby increase strength.

For the outer joint member 1, carbon steel containing sulfur of 0.005 to 0.020 mass % and carbon of 0.46 to 0.58 mass % is used. When the amount of carbon is less than 0.46 mass %, abrasion resistance of the track grooves 1d becomes lower. Sulfur exists in the steel as a chemical compound MnS, and becomes an origin of fracture when being extended lengthways by cold forging. Therefore, it is desirable that the amount of sulfur be reduced. However, if the amount of sulfur is less than 0.005 mass %, cutting workability is remarkably disturbed. Further, if the amount of sulfur exceeds 0.020 mass %, toughness of hardened portions formed by quenching remarkably decreases. Therefore, a range from 0.005 to 0.01 mass % is preferable.

The cage 4 is made of carbon steel containing carbon of 0.46 to 0.58 mass %, and is entirely hardened by induction quenching so as to have HRC of 56 to 63. By entirely hardening the cage 4 by induction quenching so as to have HRC of 56 to 63, an internal structure thereof is miniaturized, proper hardness can be obtained, and generation of cracks can be suppressed. In order to obtain HRC of 56 or more, the carbon steel is required to have carbon of 0.46 mass % or more. If the amount of carbon exceeds 0.58 mass %, life of a punch for processing the pockets 4a of the cage 4 remarkably decreases. Further, if surface roughness of the balls 3 is set to Ra 0.01 to 0.09, it is possible to increase durability of the track grooves 1d of the outer joint member 1, the track grooves 2b of the inner joint member 2, and the UJ by extension.

Figure 2A:
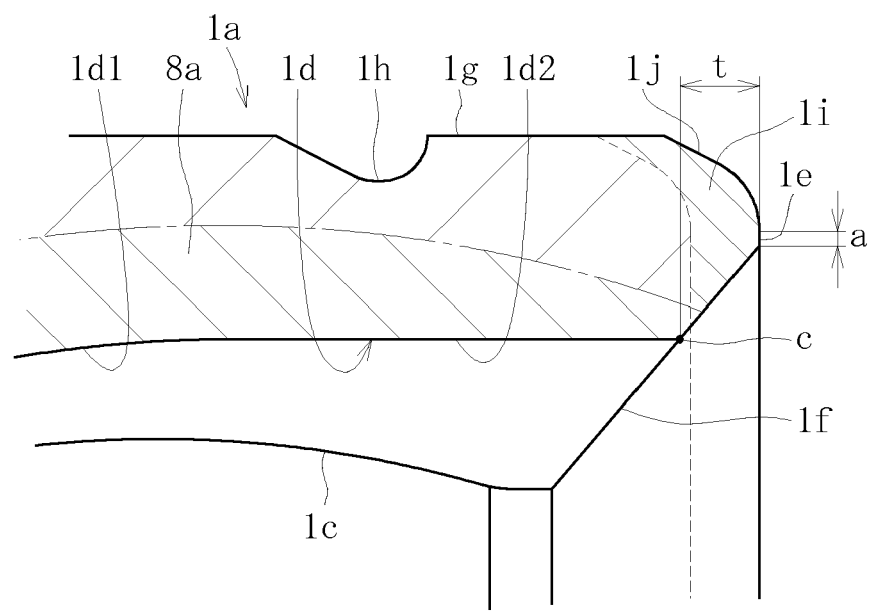
FIG. 2A illustrates an enlarged view of an outer joint member of FIG. 1.

As illustrated in FIG. 2A in an enlarged manner, the opening end surface 1e is protruded by a protruding amount t in the axial direction from a groove bottom c of each track groove 1d in the relief surface 1f of the cup portion 1a of the outer joint member 1 (a dotted line in the figure indicates the conventional example). In this case, when diameter of the balls 3 is represented by d, the protruding amount t satisfies the relation of t=0.037d to 0.185d. If the protruding amount t is less than 0.037d, effects by protruding the opening end surface 1e become insufficient. If the protruding amount t exceeds 0.185d, a radial length of the opening end surface 1e of the outer joint member 1 is reduced. As a result, a dent is sometimes formed on another outer joint member 1 during conveyance for processing, to thereby cause trouble in processing.

The opening end surface 1e and an outer surface 1j continuous with the opening end surface 1e of the cup portion 1a in a protruded portion 1i have an unhardened layer, which is not subjected to hardening by quenching. The unhardened layer extends to a part of the relief surface 1f. Further, the hardened layer 8a in the track grooves 1d of the outer joint member 1 also extends to the relief surface 1f.

Because the hardened layer 8a extends to the relief surface 1f of the cup portion 1a, it is possible to ensure strength on the opening-end side of the track grooves 1d of the cup portion 1a. Further, because the protruded portion 1i is formed and the unhardened layer extends from the opening end surface 1e to the relief surface 1f, the unhardened layer on the opening-end side of the cup portion 1a is expanded in comparison with the conventional case. Therefore, it is possible to suppress deformation by induction quenching generated on the opening-end side of the cup portion 1a.

The hardened layer formed in the bottom surface of each track groove 1d in a rolling range of the ball 3, that is, an effective hardened layer is provided with hardness of Hv 513 or more and is caused to extend to the relief surface. As a result, the hardened layer is sufficiently formed in the bottom portion of each track groove 1d, and hence fatigue strength of the bottom portion of the track groove 1d is ensured.

Surface hardness at a boundary portion between the track groove 1d and the relief surface 1f is set to Hv 500 to 780, and a grain size number is set to 8 to 13. It is preferable that size of a prior γ grain be minute as much as possible, and grain size numbers 8 to 13 are most preferable. This condition enables relaxation of stress applied to the boundary portion between the track groove 1d and the relief surface 1f, and hence strength of the cup portion 1a can be increased. If the grain size number is less than 8, quenching cracks remarkably become prone to occur.

By work hardening with cold forging, hardness of the outer surface 1g of the cup portion 1a of the outer joint member 1 is set to Hv 280 to 400. Though a hardening allowance becomes larger as the work hardening rate is higher, it leads to cracks of the product and reduction in life of a mold. Therefore, maximum hardness by the work hardening is set to Hv 400. If the work hardening rate is low, the shape of the mold is not accurately transferred on the product. Further, in the work hardening rate in which minimum hardness is low, structure is not miniaturized, and hence there exists a large ferrite difficult to be austenitized at quenching heating. The induction quenching of rapid heating for a short period of time is prone to generate incompletely-quenched structure and the strength becomes low. Therefore, a minimum hardness by the work hardening is set to Hv 280. If at least the outer surface 1g of the cup portion 1a positioned on the bottom of the opening end portion of the track groove 1d is hardened with this work hardening, it is possible to increase hardness of the outer surface of the cup portion 1a, in particular, the outer surface as the origin of fracture, to thereby increase strength of the cup portion 1a.

Figure 3:
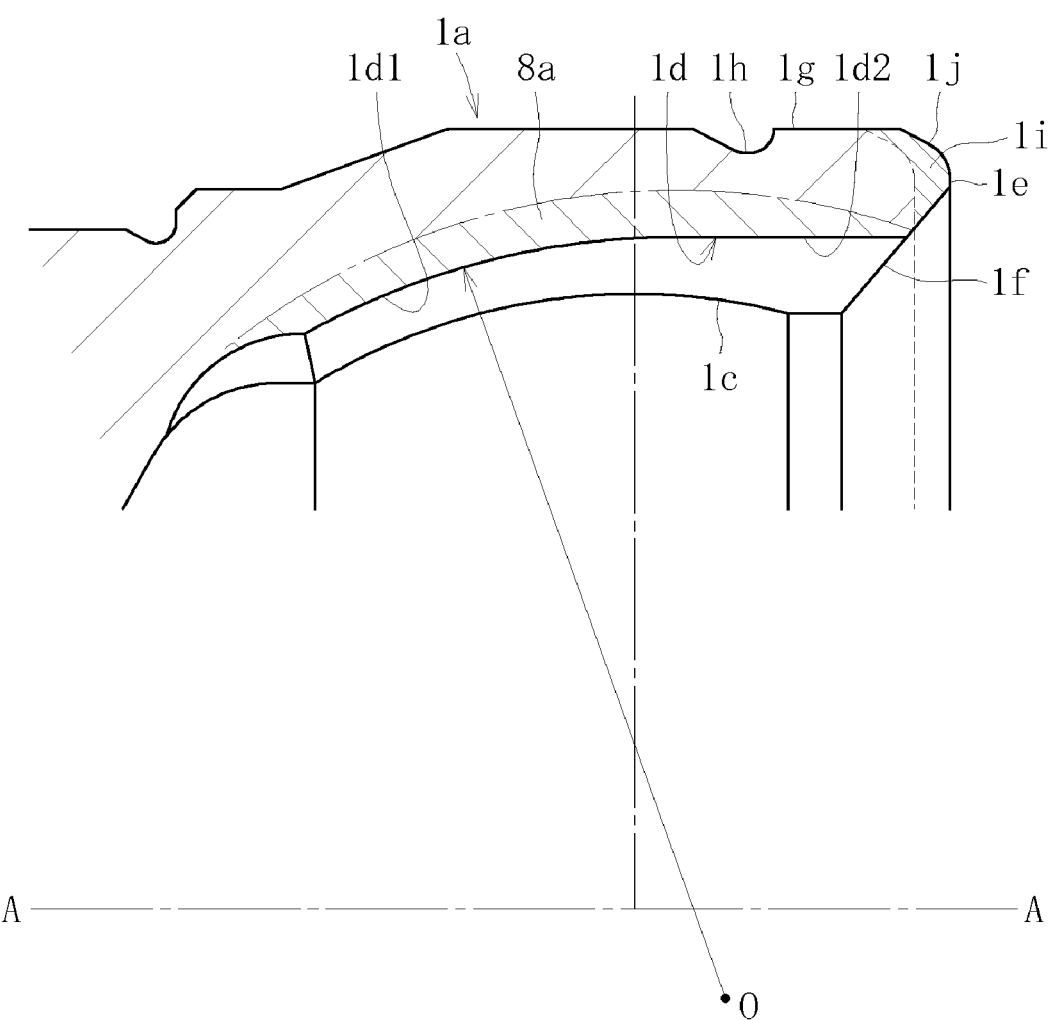
FIG. 3 is a diagram illustrating a center of curvature of a circular arc of a circular-arc portion in one of track grooves of the outer joint member of FIG. 1.

As illustrated in FIG. 3, a center of curvature O of the circular arc in the axial section of the circular-arc portion 1d1 of the track groove 1d of the outer joint member 1 is positioned on the side opposite to the side on which the circular arc in the axial section is provided with respect to an axis (A-A line in the figure) of the outer joint member 1. With this, in comparison with the conventional case in which the center of curvature O of the circular arc is positioned on the axis of the outer joint member 1, it is possible to increase permissible load on the opposite-opening-end side of the track groove 1d of the outer joint member 1.

Figure 4:
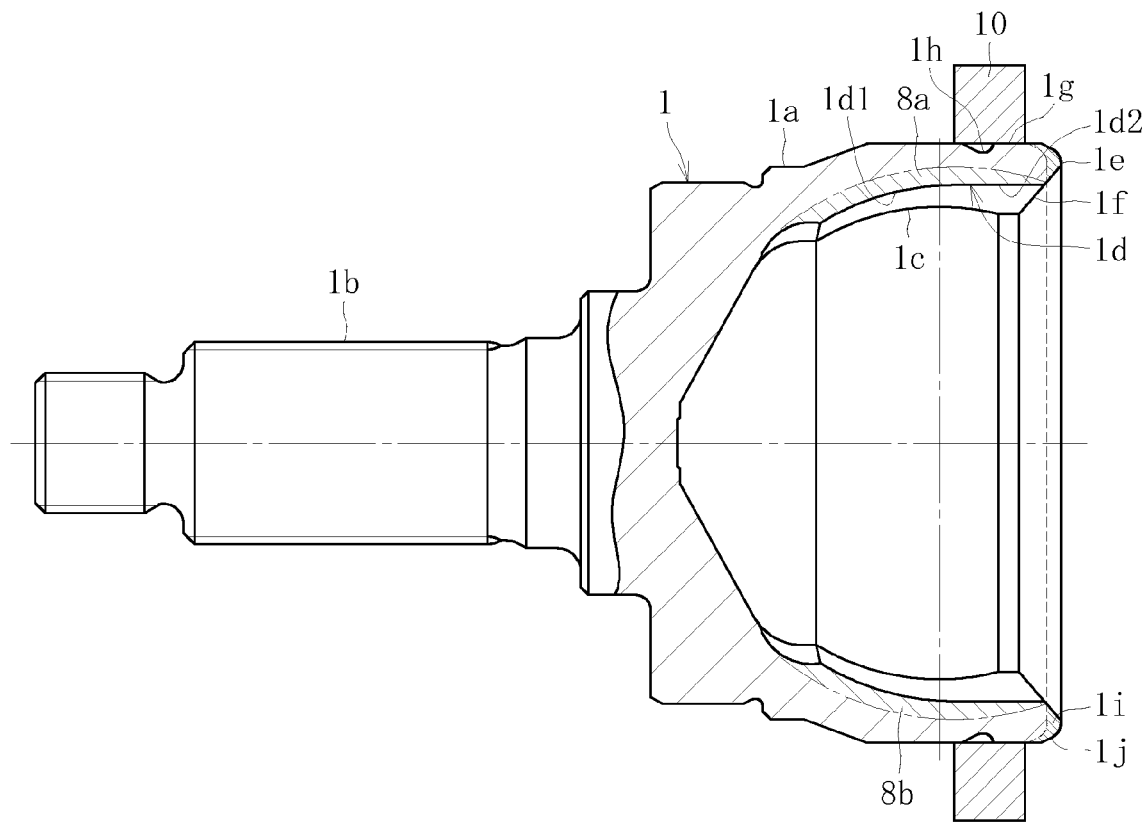
FIG. 4 is a diagram illustrating a state of subjecting the outer joint member of FIG. 1 to induction quenching.

In the manufacturing process of the outer joint member 1, as illustrated in FIG. 4, a metal ring 10 is press-fitted on the opening-end side of the outer surface 1g of the outer joint member 1 before induction quenching of the track grooves 1d. Then, after removal of heat, the metal ring 10 is eliminated. With this process, it is possible to suppress deformation of the cup portion 1a caused by induction quenching.

Further, in the manufacturing process of the outer joint member 1, a step of cooling, at induction quenching of the track grooves 1d, the boot groove 1h by water, for example, is cooled. The bottom portion of the boot groove 1h is smallest in thickness, and hence there is a risk that, if no measures are taken at the time of induction quenching, peripheries of the bottom portion are softened due to the thermal effect and deformation is increased. Further, if the thickness of the hardened layer is increased, compressive residual stress is reduced, which causes a risk of reduction in fatigue strength. On the other hand, when the boot groove 1h is cooled, for example, by applying pressurized water from the peripheries thereof at induction quenching to prevent the thermal effect, it is possible to suppress the above-mentioned softening, deformation, and reduction in fatigue strength, and hence it is possible to increase strength of the cup portion 1a. Note that whether the bottom portion of the boot groove 1h is thermally affected or not can be easily judged by presence or absence of a change in color due to heating.

Figure 5:
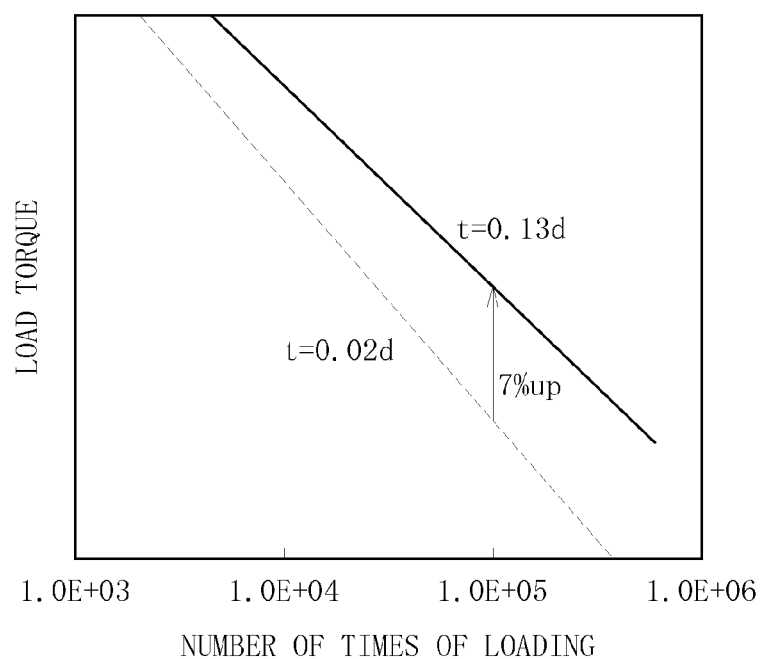
FIG. 5 is a graph showing strength of a cup portion of the outer joint member according to the embodiment of the present invention.
Figure 6A:
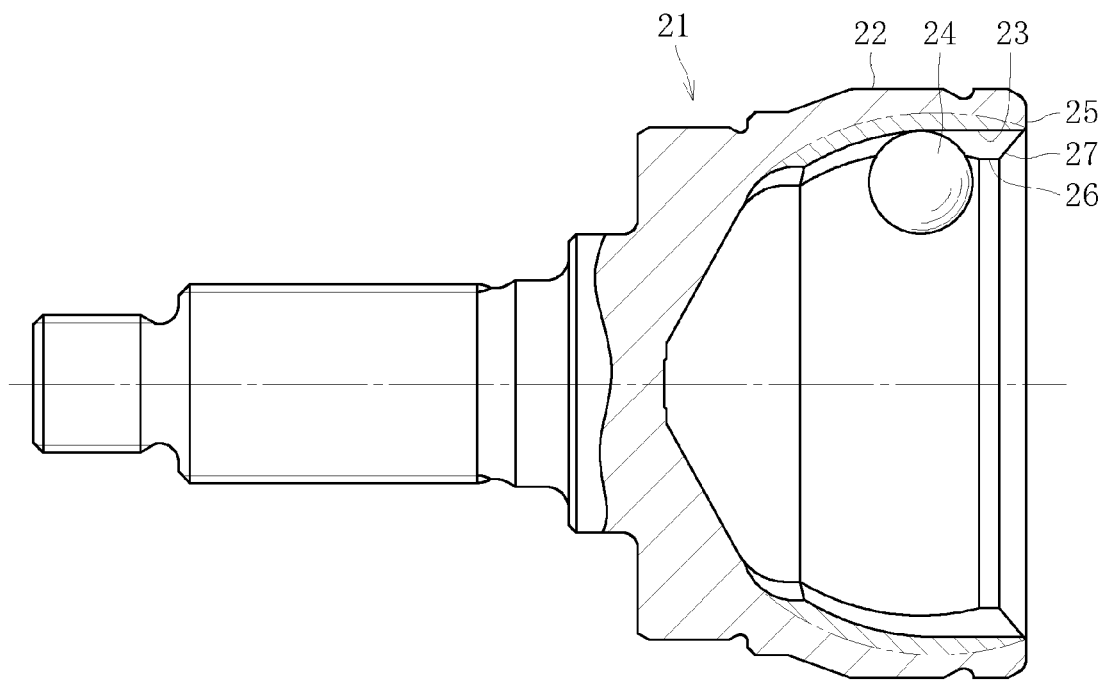
FIG. 6A illustrates an axial sectional view of an outer joint member of a conventional UJ.
Figure 6B:
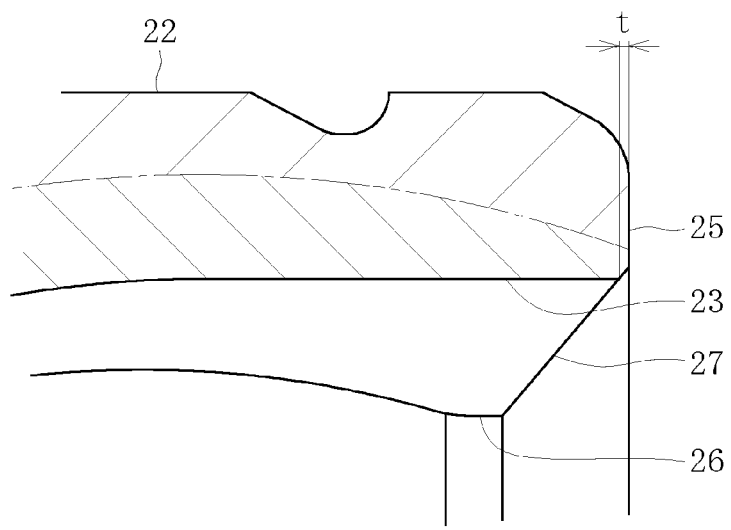
FIG. 6B is a partial enlarged view of FIG. 6A.

FIG. 5 shows strength of the cup portion 1a of the outer joint member 1 according to this embodiment. The vertical axis shows load torque and the horizontal axis shows the number of times of loading by logarithmic expression. The dotted line indicates data of the conventional product in which t=0.02d, and the solid line indicates data of the product according to this embodiment in which t=0.13d. FIG. 5 shows that, in comparison with the conventional product, permissible load torque wholly increases in the product according to this embodiment. For example, when the number of times of loading is $1.0 \times 10^5$, the permissible load torque increases by about 7%.

Figure 2B:
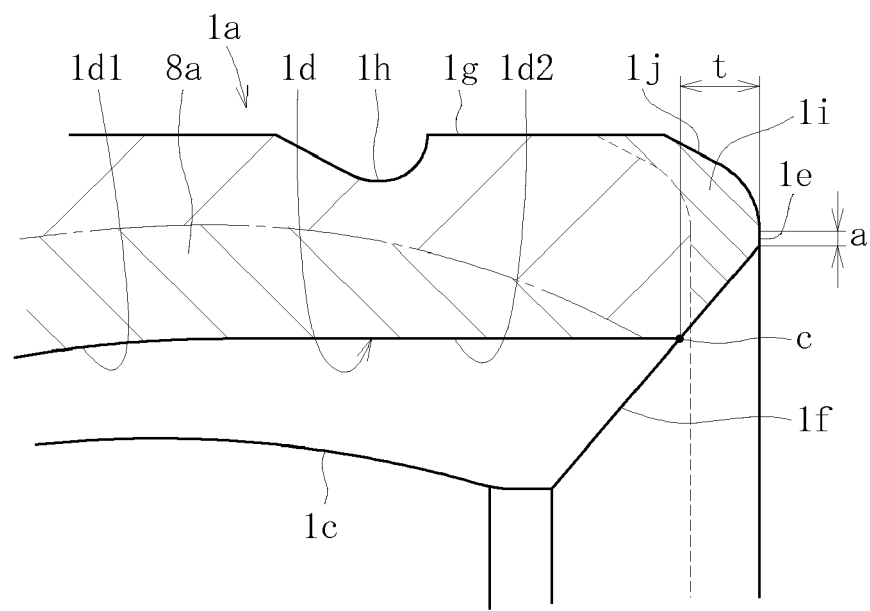
FIG. 2B is a diagram illustrating a modification of FIG. 2A.

FIG. 2B illustrates a modification of this embodiment. In this modification, the unhardened layer extends over the entire of the relief surface 1f. Conversely, the hardened layer 8a in the track groove 1d of the outer joint member 1 does not extend to the relief surface 1f. Because the protruded portion 1i is formed and the unhardened layer extends from the opening end surface 1e to the entire of the relief surface 1f, the unhardened layer on the opening-end side of the cup portion 1a is expanded in comparison with the conventional case. Therefore, deformation caused by induction quenching on the opening-end side of the cup portion 1a is suppressed. Note that the hardened layer 8b in the inner surface 1c of the outer joint member 1 does not extend to the relief surface 1f. Other structures, actions, and effects are the same as those in the above-mentioned embodiment, and hence descriptions thereof are omitted.

The present invention is not limited to the above-mentioned embodiment, and can be modified variously within the technical idea thereof.

The invention claimed is:

1. A constant velocity universal joint, comprising:
an outer joint member comprising a cup portion opening at one end thereof;
an inner joint member positioned in an interior of the cup portion;
balls interposed between the outer joint member and the inner joint member to transmit torque; and
a cage retaining the balls,
wherein the outer joint member comprises
track grooves disposed in an inner surface of the cup portion and along which the balls are capable of rolling,
a tapered relief surface extending continuously from the inner surface of the cup portion to an opening end surface, and
a boot groove disposed in an outer surface of the cup portion and in which a boot is capable of being attached, the outer surface of the cup portion being continuous to the opening end surface,
wherein the constant velocity universal joint is an undercut-free constant velocity universal joint in which each of the track grooves comprises a circular-arc portion and a straight portion each having a hardened layer formed by induction quenching, and
wherein the opening end surface protrudes by a protruding amount t in an axial direction from a center in a width direction of the track grooves in the relief surface so as to form a protruded portion, the protruding amount t satisfying a relation of t=0.037d to 0.185d when a diameter of each of the balls is represented by d;
the opening end surface in the protruded portion and the outer surface of the cup portion continuous to the opening end surface comprise an unhardened layer free from hardening by quenching;
the unhardened layer extends to the relief surface; and
the hardened layer extends to the relief surface.

2. A constant velocity universal joint according to claim 1, wherein a center of curvature of a circular arc in an axial section of the circular-arc portion of each of the track grooves is arranged on a side opposite to a side on which the circular arc in the axial section is positioned with respect to an axis of the outer joint member.

3. A constant velocity universal joint according to claim 2, wherein the outer joint member includes carbon steel containing sulfur of 0.005 to 0.020 mass percent and carbon of 0.46 to 0.58 mass percent.

4. A constant velocity universal joint according to claim 1, wherein an effective hardened layer, having a hardness value of Hv 513 or more, is extended to the relief surface.

5. A constant velocity universal joint according to claim 4, wherein a surface hardness of a boundary portion between the track grooves and the relief surface is Hv 500 to 780, and a grain size number is 8 to 13.

6. A constant velocity universal joint according to claim 5, wherein the outer joint member includes carbon steel containing sulfur of 0.005 to 0.020 mass percent and carbon of 0.46 to 0.58 mass percent.

7. A constant velocity universal joint according to claim 4, wherein the outer joint member includes carbon steel containing sulfur of 0.005 to 0.020 mass percent and carbon of 0.46 to 0.58 mass percent.

8. A constant velocity universal joint according to claim 1, wherein the outer joint member includes carbon steel containing sulfur of 0.005 to 0.020 mass percent and carbon of 0.46 to 0.58 mass percent.

9. A constant velocity universal joint according to claim 1, wherein a hardness of the outer surface of the cup portion is Hv 280 to 400 by work hardening with cold forging.

10. A constant velocity universal joint according to claim 1, wherein a thickness of the hardened layer formed on the outer surface by heat treatment is 1.2 to 2.0 mm, and the inner joint member comprises a core portion having a hardness of Hv 300 to 600.

11. A constant velocity universal joint according to claim 1, wherein the cage is carbon steel containing carbon of 0.46 to 0.58 mass percent, and is entirely hardened by induction quenching so as to have hardness of HRC 56 to 63.

12. A constant velocity universal joint according to claim 1, wherein a surface roughness of each of the balls is set to Ra 0.01 to 0.09 μm.

13. A method of manufacturing the constant velocity universal joint according to claim 1, comprising cooling the boot groove at the induction quenching of the track grooves.

14. A method of manufacturing the constant velocity universal joint according to claim 1, comprising:
performing induction quenching after a metal ring is press-fitted in an outer surface of the outer joint member; and
eliminating the metal ring after heat is removed.

* * * * *